United States Patent [19]

Boteler

[11] Patent Number: 4,631,354
[45] Date of Patent: Dec. 23, 1986

[54] COVER ASSEMBLY FOR ELECTRICAL OUTLET BOX

[75] Inventor: William C. Boteler, Bridgeport, Conn.

[73] Assignee: Harvey Hubbell Incorporated, Orange, Conn.

[21] Appl. No.: 732,960

[22] Filed: May 13, 1985

[51] Int. Cl.⁴ ............................................... H02G 3/14
[52] U.S. Cl. .................... 174/66; 339/133 R
[58] Field of Search .................. 174/53, 55, 66, 67; 220/241, 242; 339/122 R, 123, 133 R, 134; 200/296, 297

[56] References Cited

U.S. PATENT DOCUMENTS

| 612,038 | 10/1898 | Hart | 200/297 |
|---|---|---|---|
| 998,119 | 7/1911 | Peterson | 174/66 |
| 1,715,222 | 5/1929 | Chesler | 220/241 |
| 1,797,635 | 3/1931 | Buchsbaum | 220/241 |
| 1,840,582 | 1/1932 | Hubbell | 220/241 |
| 1,999,194 | 4/1935 | Hubbell, Jr. | 174/58 |
| 2,043,865 | 6/1936 | Place | 174/66 |
| 2,211,818 | 8/1940 | Innis | 174/66 X |
| 2,212,145 | 8/1940 | Benander | 174/66 X |
| 2,415,298 | 2/1947 | Linton | 200/313 |
| 2,447,597 | 8/1948 | Reed | 339/123 |
| 2,730,688 | 1/1956 | Miller | 339/128 |
| 2,740,873 | 4/1956 | Cronk | 200/295 |
| 2,934,590 | 4/1960 | Thompson et al. | 174/53 |
| 2,942,226 | 6/1960 | Low | 339/75 P |
| 3,011,008 | 11/1961 | Slater | 174/66 |
| 3,155,808 | 11/1964 | Wiley | 200/330 |
| 3,168,612 | 2/1965 | Sorenson | 174/57 |
| 3,185,760 | 5/1965 | Despard | 174/54 |
| 3,193,132 | 7/1965 | Gray | 220/307 |
| 3,197,549 | 7/1965 | Good | 174/66 |
| 3,213,189 | 10/1965 | Mitchell | 174/138 R |
| 3,329,785 | 7/1967 | Baer et al. | 200/68.1 |
| 3,364,330 | 1/1968 | Bassani | 200/296 |
| 3,444,345 | 5/1969 | Mackiewicz | 200/295 |
| 3,453,408 | 7/1969 | Mune | 200/295 |
| 3,518,356 | 6/1970 | Friedman | 174/66 |
| 3,598,900 | 8/1971 | Drake | 174/138 F |
| 3,619,476 | 11/1971 | Rasmussen | 174/58 |
| 3,619,477 | 11/1971 | Rasmussen | 174/56 |
| 3,648,878 | 3/1972 | MacKay et al. | 220/4 R |
| 3,684,925 | 8/1972 | Naff | 361/381 |
| 3,699,236 | 10/1972 | Kodaira | 174/66 |
| 3,735,020 | 5/1973 | Licata | 174/55 X |
| 3,780,773 | 12/1973 | Haugen | 138/89 |
| 3,908,235 | 9/1975 | Telliard | 411/508 |
| 3,987,928 | 10/1976 | Mori | 220/241 |
| 4,211,905 | 7/1980 | Quigley | 200/295 |
| 4,340,795 | 7/1982 | Arthur | 200/295 |
| 4,359,619 | 11/1982 | Bergoltz | 200/333 |
| 4,500,746 | 2/1985 | Meehan | 174/48 |

FOREIGN PATENT DOCUMENTS 2452173 5/1976 Fed. Rep. of Germany ........ 174/66

OTHER PUBLICATIONS

Mounting Plate made by Matsushita.

Primary Examiner—Arthur T. Grimley
Assistant Examiner—D. A. Tone
Attorney, Agent, or Firm—Jerry M. Presson; Alfred N. Goodman; Mark S. Bicks

[57] ABSTRACT

A cover assembly for an electrical outlet includes a mounting member which can be attached to an electrical device and a cover plate. The mounting member has extensions projecting from its front surface adjacent its periphery, which extensions are unitary portions of the mounting member. The cover plate has projections extending from its rear surface adjacent its periphery. The extensions and projections mate to releasably couple the mounting member to the cover plate. Tabs and notches can be provided on the sides of the mounting member to facilitate alignment of a plurality of ganged electrical devices covered by a single cover plate.

16 Claims, 13 Drawing Figures

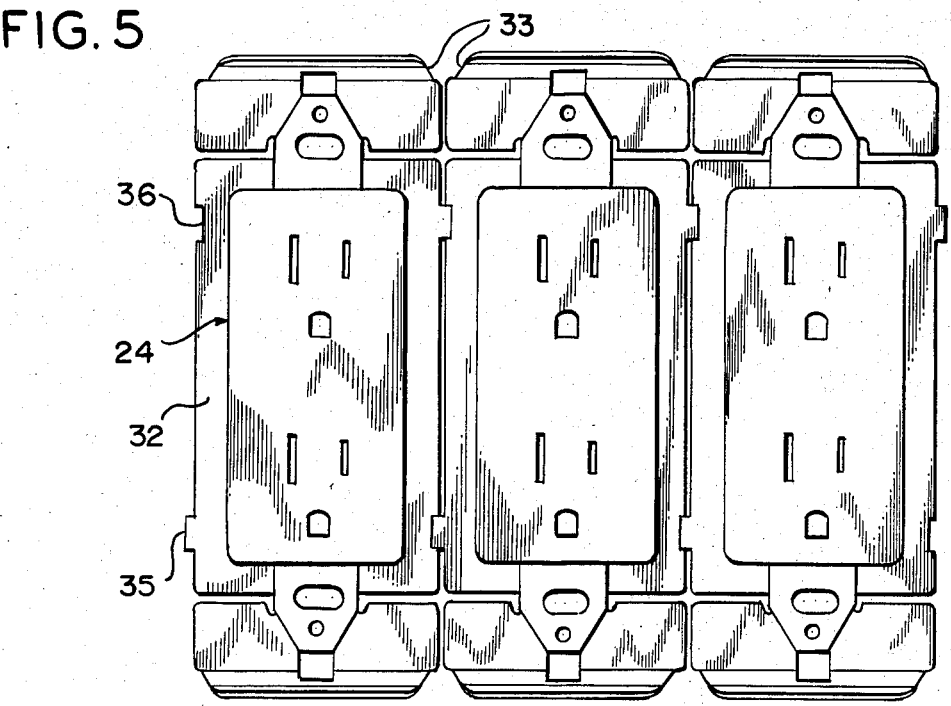
FIG. 5
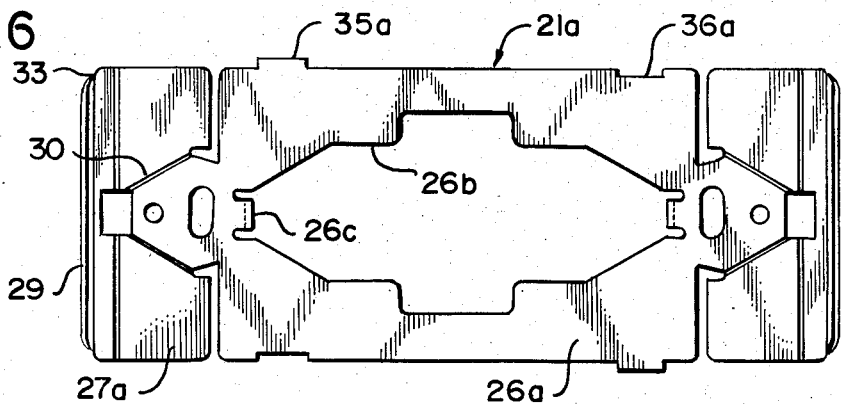
FIG. 6
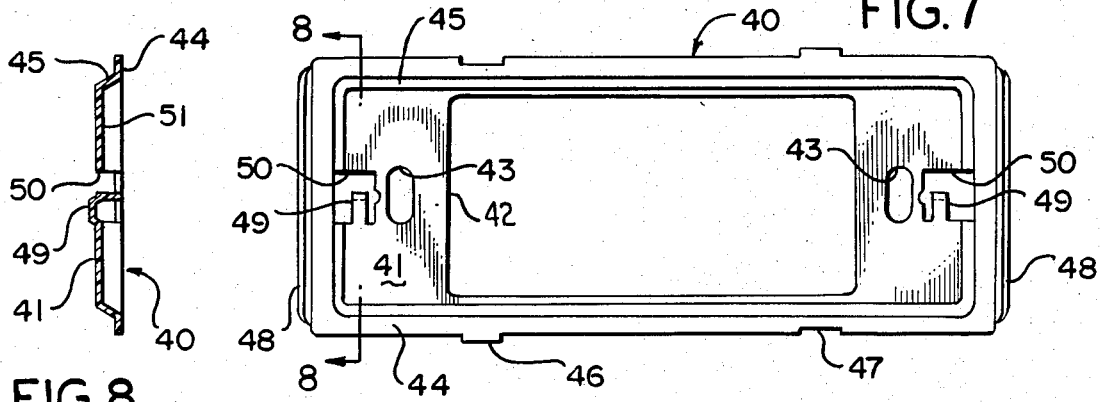
FIG. 7
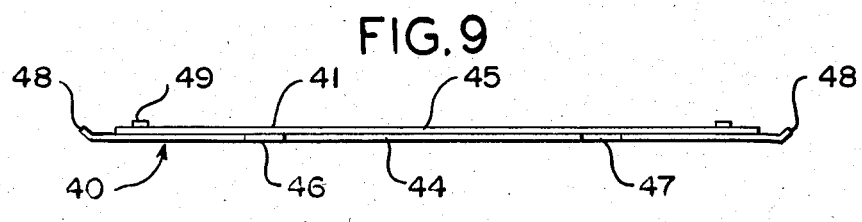
FIG. 8
FIG. 9

COVER ASSEMBLY FOR ELECTRICAL OUTLET BOX

FIELD OF THE INVENTION

The present invention relates to a cover assembly for an electrical outlet box containing a switch, an electrical receptacle or similar device. More specifically, the present invention relates to a cover plate and a mounting member coupled by unitary portions thereof, thereby eliminating separate fasteners to attach the cover plate to the mounting member.

BACKGROUND OF THE INVENTION

Wiring devices, e.g., switches, receptacles, ground fault interrupting receptacles, dimming switches and certain communications and data disconnects are conventionally mounted by screws in outlet or switch boxes of the type describe in NEMA Standards OS-1 and OS-2. A cover plate is also mounted by screws to the wiring device to completely enclose the wiring and terminations. The standards for mounting the cover plate are described in NEMA Standards WD-1 and WD-6.

Conventional cover plate installations suffer numerous disadvantages. Since the outlet box can be recessed behind the wall surface by as much as one-quarter inch and the opening formed in the wall may only roughly conform to the height and width of the outlet box, the mounting strap for the electrical device may have only a limited "footprint" or contact area with the wall to align and position the electrical device. When insufficient contact area exists between the mounting strap and the wall adjacent the rough cut opening, the positioning of the mounting strap must be adjusted by the use of shims between the device and the box or the device must be only loosely mounted in the box. Loosely mounted devices or the use of such shims can adversely effect the grounding path of the device creating a safety hazard.

The cover plate is normally intended to complete the enclosure of the wiring and terminations with the outlet box by closing the open side of the outlet box. If the exposed cover plate must satisfy electrical enclosure standards regarding flammability and mechanical strength, the material and asthetic design of the cover plate can be severely limited.

Conventional mounting straps for wiring devices have oblong, oversized mounting holes to permit adjustment of the device within the outlet box. If a plurality of devices are to be mounted and covered by a single cover plate, the vertical and horizontal axes must be properly oriented to be received within the multiple openings in the single cover plate. This presently can be accomplished only by employing the cover plate as a template using a pointed tool while the devices are loosely mounted in the outlet box or boxes.

The conventional use of screws to mount the cover plate on the electrical device or its mounting strap detracts from the aesthetic appearance of the cover plate. Moreover, the metal screws must be conductively bonded to the grounding path.

Although cover plate mounting arrangements without screws have been disclosed, such arrangements have not been found to be effective. Typical examples are disclosed in U.S. Pat. Nos. 1,840,582 to Hubbell, 2,043,865 to Place, 2,740,873 to Cronk, 3,011,008 to Slater, 3,197,549 to Good, 3,518,356 to Friedman, 3,987,928 to Mori, and 4,500,746 to Meehan.

SUMMARY OF THE INVENTION

An object of the present invention is to provide a cover plate assembly which eliminates screws and permits the cover plate to have a snap-on connection with its mounting member.

Another object of the present invention is to provide a cover plate assembly which can space and vertically and horizontally align each of the devices in a multiple device installation.

A further object of the present invention is to provide a cover plate assembly wherein the parts can be inverted.

Yet another object of the present invention is to provide a cover plate assembly having a non-exposed mounting member of sufficient height, width, integrity, and flame resistant characteristics to completely enclose the electrical box and to extend sufficiently beyond the wall opening to provide a good contact surface with the wall for secure mounting.

Still another object of the present invention is to provide a cover assembly having a snap-on connection for the cover plate, but which is readily adaptable to conventional screw mountings.

The foregoing objects are obtained by a cover assembly for an electrical outlet box comprising a mounting member having coupling means attaching an electrical device to the mounting member and a cover plate. The mounting member has extensions projecting from a front surface adjacent its periphery, which extensions are unitary portions of the mounting member. The cover plate has projections extending from a rear surface adjacent its periphery. The extensions and projections mate to releasably couple the mounting member to the cover plate.

By forming the cover assembly in this manner, no portion of the assembly extends into wall and the cover plate can be readily removed and replaced. No separate fastening member is required to fix the cover plate to the mounting member. Since the extensions and projections are located adjacent the periphery of the mounting member and cover plate, the cover plate will closely conform to the wall surface.

Additionally, the mounting member can be made relatively wide to provide good contact with the wall and to fully close the outlet box opening. This seals the outlet box such that the cover plate need only be designed for asthetic purposes. Forming the mounting member and cover plate in this manner also permits the formation of tabs and notches on the mounting member to facilitate aligning adjacent devices in multiple device installations.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this original disclosure:

FIG. 5 is a top plan view of a plurality of ganged electrical devices of FIG. 1;

FIG. 6 is a top plan view of a mounting strap for a switch according to the present invention;

FIG. 7 is a top plan view of a mounting member adaptor of a cover assembly according to a second embodiment of the present invention;

FIG. 8 is an end elevational view in section taken along lines 8—8 of FIG. 7;

FIG. 9 is a side elevational view of the adaptor of FIG. 7;

DETAILED DESCRIPTION OF PREFERRED EMBODIMENT

Figure 1:
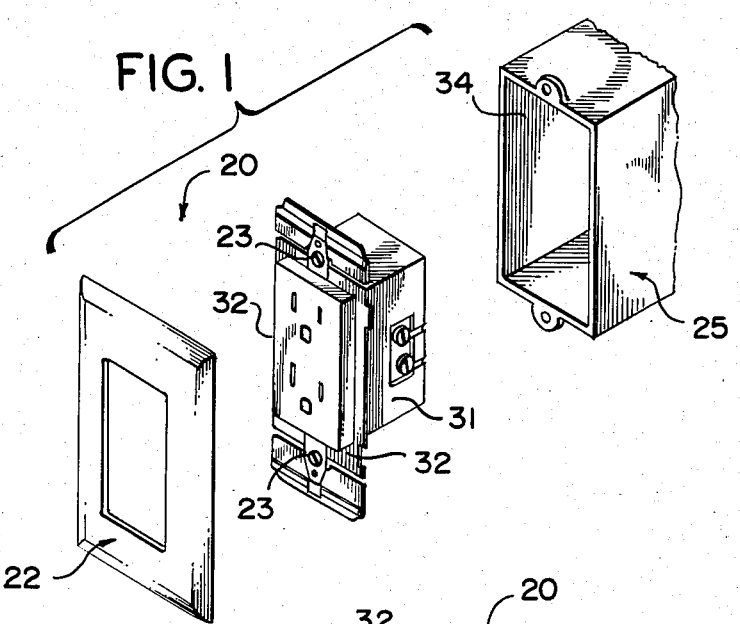
FIG. 1 is an exploded, perspective view of a cover assembly according to a first embodiment of the present invention.
Figure 2:
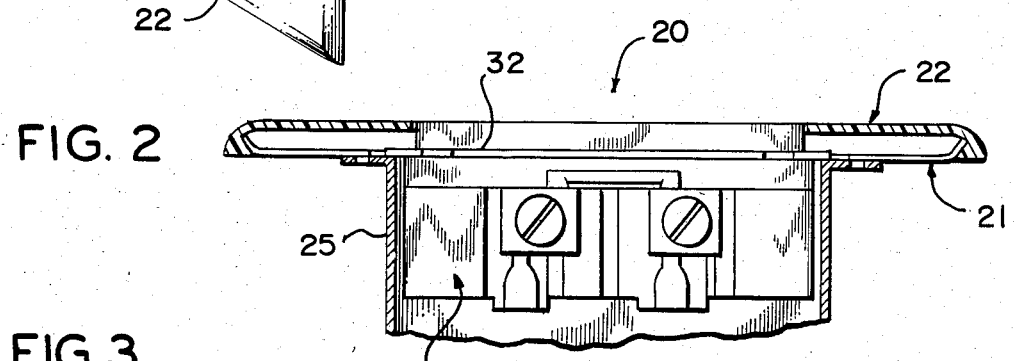
FIG. 2 is a side elevational view in section of the cover assembly of FIG. 1.

Referring initially to FIGS. 1 and 2, the cover assembly 20 of the present invention comprises a mounting member in the form of a mounting strap 21 and a cover plate 22. The mounting strap is formed of metal, while the cover plate is molded from a suitable plastic or can be formed from metal as long as it is sufficiently resilient to adequately deform during installation.

Mounting strap 21 is fixed to an electrical device 24 in a suitable manner. Such device can comprise various forms of electrical switches, receptacles and connectors. The mounting strap is mounted in an electrical outlet box 25 according to conventional practice, for example, by screws 23.

Figure 3:
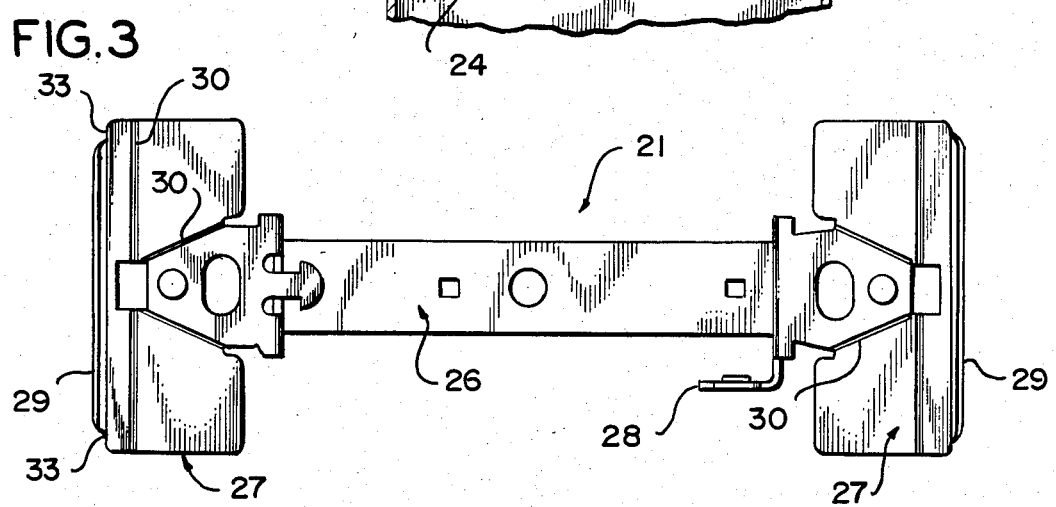
FIG. 3 is a top plan view of the mounting strap of FIG. 1.
Figure 4:
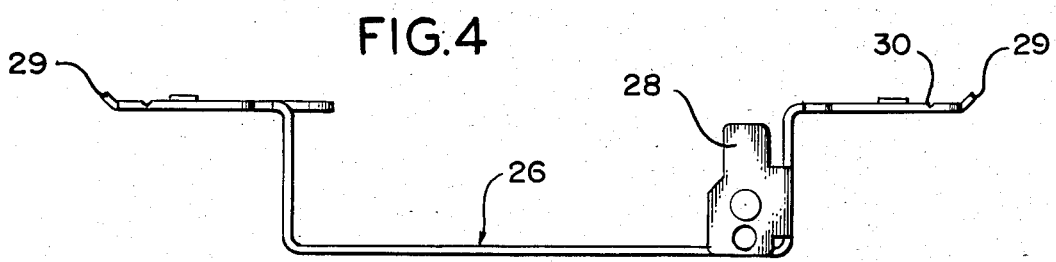
FIG. 4 is a side elevational view of the mounting strap of FIG. 7.

As illustrated in FIGS. 3 and 4, mounting strap 21 comprises a generally conventional U-shaped central section 26 and laterally extended end sections 27. The end sections extend outwardly from the central section. The central section forms a conventional coupling with the electrical device and has a grounding terminal 28. End sections 27 extend beyond outlet box 25 to provide a positive surface-to-surface contact with the wall in which the outlet box is mounted.

Relatively rigid, elongated lips 29 extend at acute angles on opposite ends of end sections 27. In this manner, the lips extend upwardly and outwardly from the remainder of the end sections. The extended end sections are attached to the conventional central section 26 by way of grooves 30. Grooves 30 permit the extended end sections to be removed from the remainder of the mounting strap 21 by bending to permit use of the strap with a conventional cover plate attached by screws.

Electrical device 24 has an insulating housing 31 with a unitary flange 32. As illustrated in FIGS. 1, 2 and 5, flange 32 extends laterally on all four sides of housing 31 adjacent its front face, but spaced slightly inwardly therefrom. The length and width dimensions of the flange are substantially equal to or larger than those of the standard outlet box such that the flange closes the outlet box opening 34. Typically, the flange width is about 1 and 13/16 inches, while the flange length is about 3 inches. The standard outlet box opening is about 1⅜ inches wide and about 2⅞ inches high.

The opposite side edges of housing flange 32 have laterally outwardly extending tabs 35 and laterally opening notches 36. Each lateral side has one tab and one notch. The notch on one side edge is located laterally adjacent the tab on the other side edge of the flange. By forming the tabs and notches in this manner, a plurality of electrical devices 24 can be properly positioned and aligned in a ganged or multi-device installation, as illustrated in FIG. 5. To align and position the devices, the tabs of one device are located in the notches of adjacent devices. Since the notch and tab on each side edge are symmetrically arranged relative to or equally spaced from the center of the electrical device, each device can be aligned in one of two, relatively inverted positions. The aligned and positioned devices can then be easily covered by a single, large cover plate.

As illustrated in FIGS. 3 and 5, the corners of mounting strap 21 are removed forming recesses 33 in the longitudinal ends of lips 29. In the ganged assembly of FIG. 5, recesses 33 provide spaces between the lips.

Referring to FIG. 6, a metal mounting strap 21a for a toggle switch or wiring device comprises a planar central section 26a and laterally extending end sections 27a. End sections 27a are identical to end sections 27 of mounting strap 21, and thus, are not described in detail. Central section 26a has a central opening 26b and depending members 26c for coupling strap 21a to a device in a generally conventional manner. Additionally, central section 26a has length and width dimensions which are substantially equal to or larger than those of the standard outlet box. The opposite side edges of the central section have tabs 35a and notches 36a, arranged and operating similar to tabs 35 and notches 36 on housing flange 32.

Conventional mounting straps can be adapted to incorporate the present invention, by using an adaptor plate 40 as illustrated in FIGS. 7-9 and 13. The adaptor plate is formed of a size larger than outlet box 25 to completely cover the opening in the outlet box and extend beyond it to provide a positive surface-to-surface contact with the wall in which the outlet box is mounted.

The details of the adaptor plate are illustrated in FIGS. 7-9. Adaptor plate 40 comprises a planar base section 41 having a large rectangular central opening 42 through which electrical device 24 extends. Suitable apertures 43 are provided on the opposite ends of central opening 42 to facilitate connection of the adaptor to both the mounting strap and to the outlet box by screws extending therethrough.

The lateral sides and ends of base member 26 are surrounded by a peripheral flange 44 extending generally parallel to base section 41. Flange 30 is offset from base section 41 and separated therefrom by wall 45. Each lateral side of flange 44 has a laterally outwardly extending tab 46 and a laterally opening notch 47. As illustrated in FIG. 7, the notch on one side edge of adaptor plate 40 is located laterally adjacent the tab on the other side edge of the adaptor plate. By forming the tabs and notches in this manner, a plurality of adaptor plates can be used to properly position and align a plurality of electrical devices in a ganged or multi-device installation, similar to the installation illustrated in FIG. 5. To align and position the devices, the tabs of one adaptor plate are located in the notches of an adjacent adaptor plate.

Elongated, relatively rigid lips 48 extend from opposite end edges of flange 44. The lips extend at an acute angle relative to planar flange 44. Lips 48 extend upwardly and outwardly from the flange.

Projections 49 are provided adjacent the ends of adaptor plate 40 between flange 44 and base section 41. The projections extend downwardly from base section 41 through openings 50. When a conventional electrical device is placed against the bottom surface 51 of base section 41 between walls 45, projections 49 extend into the internally threaded apertures in the device mounting strap, provided for the screws to attach a face plate. The engagement of the internally threaded apertures and projections 49 aligns the adaptor plate vertically and horizontally with the device.

Figure 10:
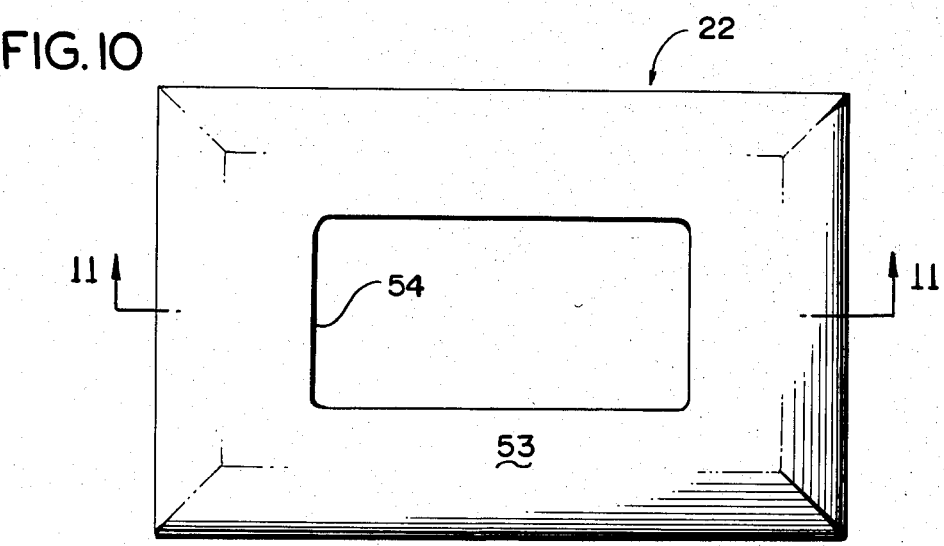
FIG. 10 is top plan view of the cover plate for the assembly of FIGS. 1 or 7.
Figure 11:
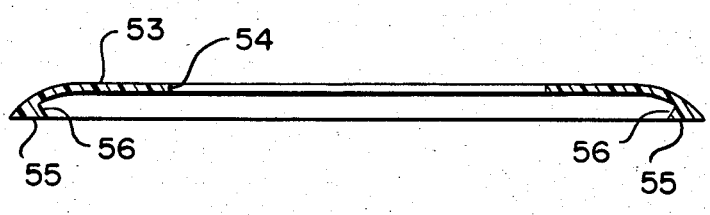
FIG. 11 is a side elevational view in section taken along lines 11—11 in FIG. 10.
Figure 12:
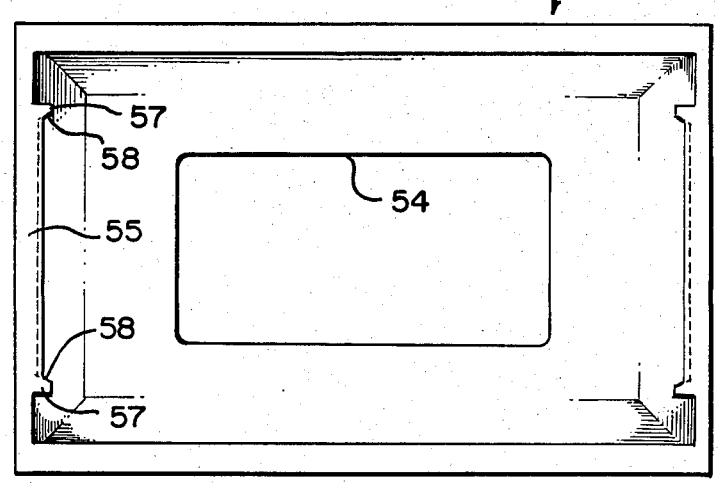
FIG. 12 is bottom plan view of the cover plate of FIG. 10.
Figure 13:
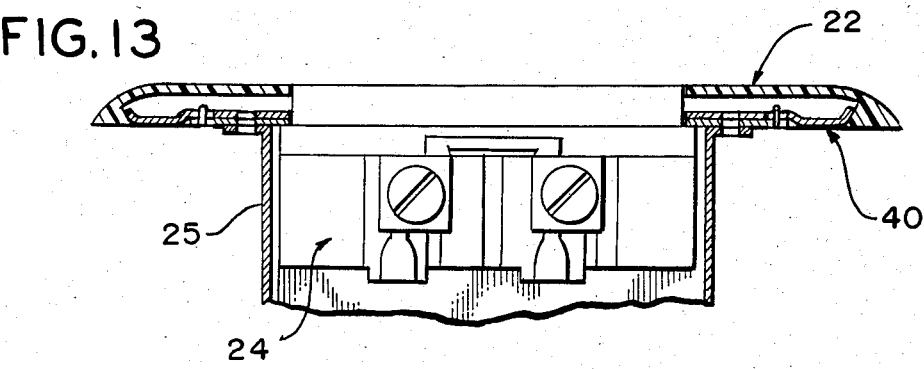
FIG. 13 is a side elevational view in section of a cover assembly according to the second embodiment of the present invention.

The details of cover plate 22, for the assembly with mounting strap 21 as illustrated in FIGS. 1-2 or with adaptor plate 40 as illustrated in FIG. 13, are illustrated in FIGS. 10-12. Cover plate 22 has a generally planar front face 53 and a central opening 54 for receiving the electrical device. On the bottom surface of the cover plate, elongated and parallel ledges 55 extend toward each other from opposite end edges of cover plate 22. Ledges 55 have gripping surfaces 56 extending along acute angles relative to the front face, which acute angles correspond to the angular extension of lips 29 and 48. The lips and ledges will positively engage one another, as illustrated in FIGS. 2 and 13, to positively couple the cover plate to the mounting member formed by adaptor plate 40 or mounting strap 21.

Projections 56 extend inwardly from the opposite end edges of cover plate 22 at the longitudinal ends of elongated ledges 55. Projections 57 have angled or tapered lead-in surfaces 58 for facilitating mounting of the cover on the mounting member.

Cover plate 22 is mounted on adaptor plate 40 or mounting strap 21 or 21a merely by snapping it onto lips 48 or 29. The cover plate is flexible and convex. When the plate is pressed against the mounting member and a wall, the cover plate will flatten, increasing the distance between ledges 55 to pass over the elongated lips. Lead-in surfaces 58 assist in properly positioning the cover plate over the mounting member to center opening 54 over the electrical device. With a large cover plate covering a ganged installation such as that of FIG. 5, the cover plate has a plurality of laterally spaced, pairs of opposite ledges. The spacing between the lips provided by recesses 33 accommodates the lateral spacing between the ledges.

The coupling of the cover plate to the mounting member is achieved by a mechanism located between the mounting member and the cover plate. Such mechanism does not extend through the plane of the wall in which the outlet box is mounted and does not extend inwardly beyond the mounting member. This permits the cover-mounting member assembly to be used on outlet or switch boxes having varying opening configurations, and with electrical devices having various dimensions in the plane of the wall. Additionally, the mechanism can improve the security of the attachment of the electrical receptacle to the wall.

While various embodiments have been chosen to illustrate the invention, it will be understood by those skilled in the art the various changes and modifications can be made therein without departing from the scope of the invention as defined in the appended claims.

What is claimed is:

1. A cover assembly for an electrical outlet box, comprising:

a mounting strap having a longitudinal axis mounting an electrical device with a peripheral flange extending laterally therefrom adjacent a front face of the device, said mounting strap having opposite ends mounting a plurality of elongated lips with each lip being adjacent a different end of said strap, the lips being elongated in a direction substantially perpendicular to said longitudinal axis and extending substantially parallel to one another, a substantially planar, central section of said strap between said lips, each of said lips formed unitary with said strap and extending outwardly away from said central section at an acute angle relative to the plane of said central section; and a cover plate having a substantially planar rearward surface and opposite ends and comprising a plurality of ledges each adjacent an opposite end of said plate for engaging different ones of said lips, each of said ledges of said cover plate being elongated and extending substantially parallel to one another and to said lips, said ledges being adjacent said rearward surface and inclined toward each other and being spaced apart laterally substantially the same distance as said lips; and said plate being resilient and having a convex cross sectional portion, whereby pressing the convex portion towards said strap flattens said plate and permits said ledges to pass over said lips to and thereby couple said plate to said strap.

2. A cover assembly according to claim 1 wherein said flange has length and width dimensions at least equal to length and width dimensions of a standard outlet box.

3. A cover assembly according to claim 1 wherein said mounting member is coupled to said electrical device in an opening of an outlet box, said flange having length and width dimensions at least equal to length and width dimensions of said opening of said outlet box.

4. A cover assembly according to claim 1 wherein said flange comprises first and second lateral edges, each said edge having a notch and a tab of like configuration, said tab on said first side being laterally opposite said notch on said second side, said tab on said second side being laterally opposite said notch on said first side; thereby engagement of tabs and notches on adjacent electrical devices facilitates alignment thereof.

5. A cover assembly for an electrical outlet box, comprising:

a mounting member having coupling means for attaching an electrical device to said mounting member and having extensions projecting from a front surface adjacent a periphery thereof, said extensions being unitary portions of said mounting member;

a cover plate having projections extending from a rear surface adjacent a periphery thereof, said extensions and said projections mating to releasably couple said mounting member to said cover plate;

said mounting member comprising an essentially planar mounting strap which supports the electrical device; and wherein said mounting member comprises first and second lateral edges, each said edge having a notch and a tab of like configuration, said tab on said first side being laterally opposite said notch on said second side, said tab on said second side being laterally opposite said notch on said first side; whereby engagement of tabs and notches on adjacent electrical devices facilitates alignment thereof.

6. A cover assembly for an electrical outlet box having an opening thereto, comprising:
   a mounting member having coupling means for attaching an electrical device with a mounting strap to said mounting member and having extensions projecting from a front surface adjacent a periphery thereof, said extensions being unitary portions of said mounting member;
   a resilient cover plate having projections extending from a rear surface adjacent a periphery thereof, said extensions and said projections mating when said plate is pressed inwardly towards said mounting member to releasably couple said mounting member to said cover plate; and
   said mounting member including an adaptor plate coupled to the electrical device mounting strap for substantially enclosing the opening to the outlet box.

7. A cover assembly according to claim 6 wherein said adaptor plate has depending projections for engaging openings in said mounting strap.

8. A cover assembly according to claim 6, wherein said adaptor plate has length and width dimensions at least equal to length and width dimensions of a standard outlet box.

9. A cover assembly according to claim 6 wherein said adaptor plate is coupled to said electrical device in an opening of an outlet box, said adaptor plate having length and width dimensions at least equal to length and width dimensions of said opening of said outlet box.

10. A cover assembly according to claim 6 wherein said adaptor plate comprises first and second lateral edges, each said edge having a notch and a tab of like configuration, said tab on said first side being laterally opposite said notch on said second side, said tab on said second side being laterally opposite said notch on said first side; whereby engagement of tabs and notches on adjacent electrical devices facilitates alignment thereof.

11. A cover assembly for an electrical outlet box, comprising:
   a mounting member having opposite end portions and coupling means for attaching an electrical device to said mounting member, said member having a plurality of extensions projecting from a front surface thereof adjacent each end portion thereof, the extensions being unitary portions of said mounting member;
   a cover plate having projections extending from a rear surface adjacent a periphery thereof, said extensions and said projections mating to releasably couple said mounting member to said cover plate; and
   said mounting member having grooves separating said end portions of said mounting member bearing said extensions from the remainder of said mounting member to facilitate removal of said extensions from said mounting member.

12. A cover assembly for an electrical outlet box, comprising:
   a mounting member having coupling means for attaching an electrical device to said mounting member and having extensions projecting from a front surface adjacent a periphery thereof, said extensions being unitary portions of said mounting member;
   a cover plate having projections extending from a rear surface adjacent a periphery thereof, said extensions and said projections mating to releasably couple said mounting member to said cover plate; and
   said mounting member comprising first and second lateral edges, each said edge having a notch and a tab of like configuration, said tab on said first side being laterally opposite said notch on said second side, said tab on said second side being laterally opposite said notch on said first side; whereby engagement of tabs and notches on adjacent mounting member facilitates alignment thereof.

13. The cover assembly according to claim 21 wherein there are a plurality of elongated mounting members in juxtaposed relationship mounted proximate the opening in the outlet box, each of said mounting members mounting a wiring device therein and having first and second lateral edges, the first and second edges of each said member extending laterally to substantially abut a corresponding first or second edge of an adjacent mounting member, whereby the opening in the outlet box is substantially covered by the longitudinally aligned mounting members and their wiring devices, each of said lateral edges having a notch and a tab substantially equidistant from the center of the mounting member in a direction substantially parallel to the longitudinal axis of the member, the tabs on said first edges positioned laterally opposite the notches on said second edges and the tabs on said second edges positioned laterally opposite the notches on first said edges, whereby said mounting members may be mounted in longitudinal alignment in either of two relatively inverted positions.

14. A cover assembly for an electrical outlet box, comprising:
   a mounting strap having a longitudinal axis for mounting an electrical device therein, said mounting strap having opposite substantially coplanar ends mounting a plurality of elongated lips with each lip being adjacent a different end of said strap, the lips being substantially linear in a direction substantially perpendicular to said longitudinal axis and spaced apart laterally substantially parallel to one another, each of said lips extending outwardly from its adjacent-most strap end at an acute angle relative to the plane of such end; and
   a cover plate having a substantially planar rearward surface and opposite ends and comprising a plurality of ledges each adjacent an opposite end of said plate for engaging different ones of said lips, each of said ledges of said cover plate being elongated and extending substantially parallel to one another and to said lips, said ledges being inclined inwardly toward each other and being spaced apart laterally a distance substantially equal to the lateral spacing between said lips; and
   said plate being resilient and having a convex cross sectional portion, whereby pressing said plate portion towards said strap flattens said plate sufficiently to cause said ledges to slide over and behind said lips to thereby couple said plate to said strap upon the return of said plate portion to said convex cross-sectional shape.

15. The cover assembly according to claim 14, and further including;
   means adjacent each end of one of said ledges for orienting said cover plate centrally on said mounting strap.

16. The cover assembly according to claim 15 wherein the orienting means comprises a pair of angled surfaces formed on opposite ends of the one ledge.

* * * * *